United States Patent [19]

Powers

[11] Patent Number: 5,521,362
[45] Date of Patent: May 28, 1996

[54] ELECTRONIC PURSE CARD HAVING MULTIPLE STORAGE MEMORIES TO PREVENT FRAUDULENT USAGE AND METHOD THEREFOR

[75] Inventor: Robert S. Powers, Plano, Tex.

[73] Assignee: MCI Communications Corporation, Washington, D.C.

[21] Appl. No.: 257,251

[22] Filed: Jun. 8, 1994

[51] Int. Cl.⁶ .................................................. G06K 5/00
[52] U.S. Cl. ................................... 235/380; 235/379
[58] Field of Search ................................... 235/379, 380

[56] References Cited

U.S. PATENT DOCUMENTS

| | | | |
|---|---|---|---|
| 4,766,293 | 8/1988 | Boston | 235/380 X |
| 4,837,422 | 6/1989 | Dethloff et al. | 235/379 X |
| 4,877,950 | 10/1989 | Halpern | 235/380 X |

Primary Examiner—John Shepperd
Assistant Examiner—Michael G. Lee

[57] ABSTRACT

An electronic purse card includes a housing, a plurality of electrical contacts thereon for communication with a foreign transaction device, a memory, and a processor operatively joined to the memory and contacts. The memory includes first and second registers for storing a main amount of currency and a withdrawable amount of currency, respectively. The processor allows downloading of a selected portion of the currency from the first register into the second register, and withdrawal of currency by the transaction device solely from the second register to limit currency withdrawals. In a method of use, the card is inserted into the transaction device for withdrawing a transaction amount from solely the second register. The second register may be replenished by selectively downloading currency amounts from the first to second registers.

11 Claims, 5 Drawing Sheets

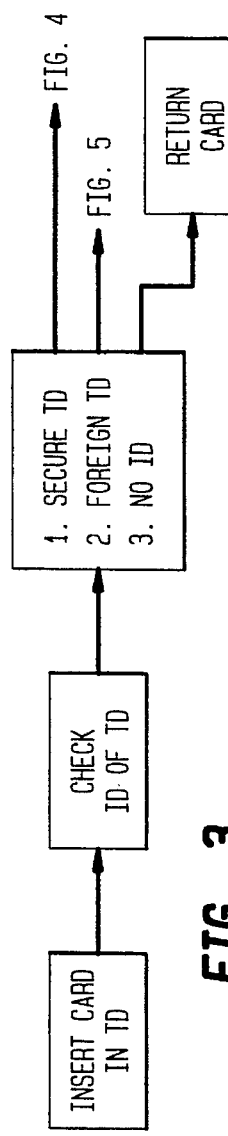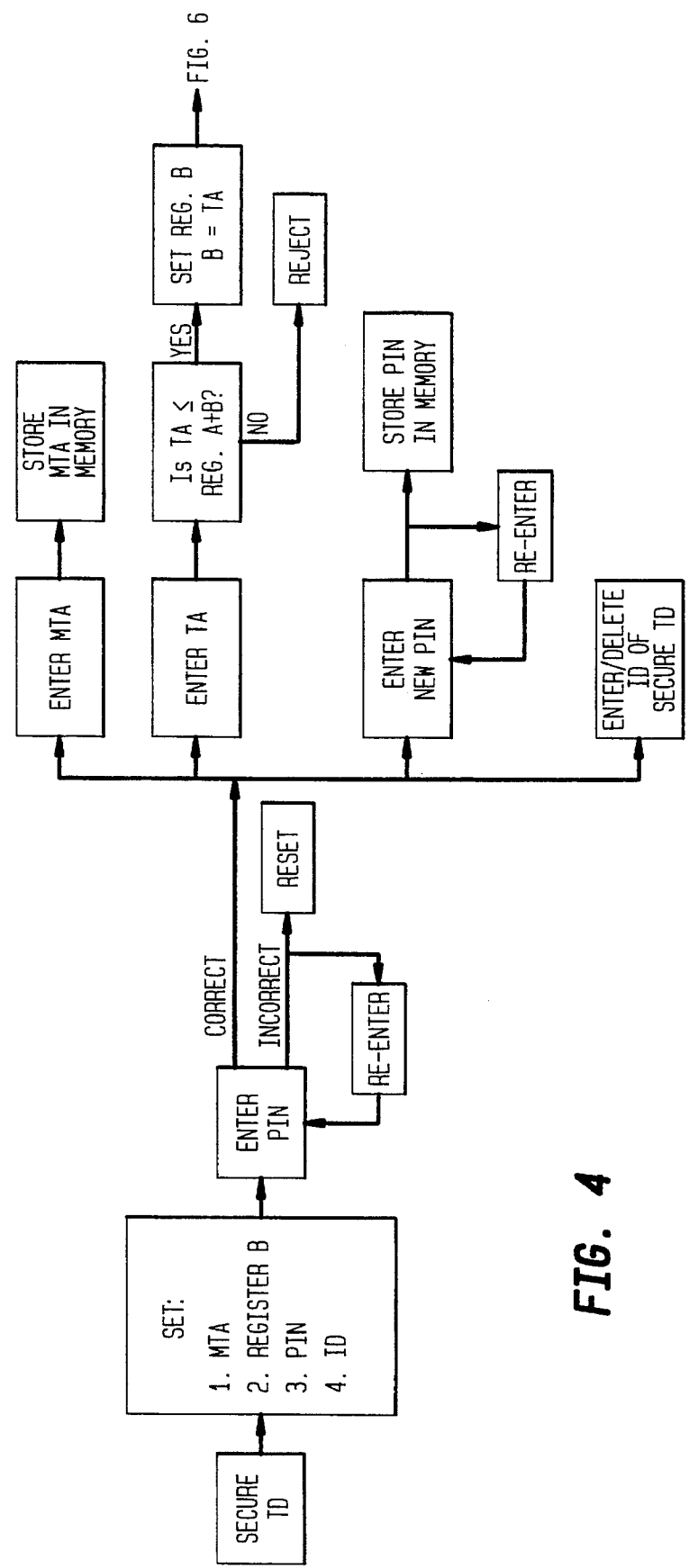
FIG. 3
FIG. 4

ELECTRONIC PURSE CARD HAVING MULTIPLE STORAGE MEMORIES TO PREVENT FRAUDULENT USAGE AND METHOD THEREFOR

The present invention relates generally to credit or debit cards, and, more specifically, to an electronic SmartCard having a computer chip therein.

BACKGROUND OF THE INVENTION

A conventional credit card allows a user to make a purchase from a vendor by simply recording the credit card number and the user's signature on a suitable form, with actual transfer of funds therefor being made at a later time between the credit card company and the vendor. Similarly, a conventional debit or bank card allows a user to make a purchase from a vendor by authorizing a transfer of funds from a preexisting user account, such as a checking account, to the vendor. In both situations, the card itself does not contain an indication of available credit, but typically includes a magnetic strip in which is magnetically stored certain information such as account identification numbers.

Intelligent or smart cards are being developed in the size of conventional plastic credit cards, which include an imbedded computer chip therein having processing power and memory or storage capacity therein. For example, the International Standards Organization (ISO) has established certain specifications for such electronic cards under the ISO Series 7810, 7811, and 7816. The typical electronic card includes a plurality of spaced apart electrical contacts on one surface thereof which provides input and output interfaces with the computer processor and memory in the card.

One application for the electronic card is an electronic purse. In this configuration, a prepaid amount of credit or electronic currency is stored in the card memory for use in the place of conventional cash. The source of the currency installed in the card may take any suitable form such as a bank account, a credit card, a debit card, another electronic card, or other sources. In operation, the electronic card is inserted into a conventional transaction device which communicates with the card through the contacts. The transaction device would be associated with the typical cash register of a vendor, for example, so that the amount of purchase from the vendor may be directly withdrawn from the electronic card itself by correspondingly reducing the available currency stored in the card memory.

However, this arrangement provides no protection for the user from an unscrupulous vendor having a transaction device configured for withdrawing from the card more than the authorized amount. A simple analogy would entail providing the user's entire billfold or purse to the vendor who then is supposed to remove from the entire amount of currency contained therein only that amount required for the specific purchase. If the vendor is unscrupulous, more than the required purchase amount may be taken without authorization of the purchaser. Accordingly, it is desirable to have an electronic purse card limiting or preventing unauthorized access to the currency amounts stored therein.

SUMMARY OF THE INVENTION

An electronic purse card includes a housing, a plurality of electrical contacts thereon for communication with a foreign transaction device, a memory, and a processor operatively joined to the memory and contacts. The memory includes first and second registers for storing a main amount of currency and a withdrawable amount of currency, respectively. The processor allows downloading of a selected portion of the currency from the first register into the second register, and withdrawal of currency by the transaction device solely from the second register to limit currency withdrawals. In a method of use, the card is inserted into the transaction device for withdrawing a transaction amount from solely the second register. The second register may be replenished by selectively downloading currency amounts from the first to second registers.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 3 is a flow chart of initial electronic card processor operation for determining the status of a transaction device receiving the electronic card.

FIG. 4 is a flow chart of the electronic card processor software indicating exemplary operations available with a secure transaction device.

DESCRIPTION OF THE PREFERRED EMBODIMENT(S)

Figure 1:
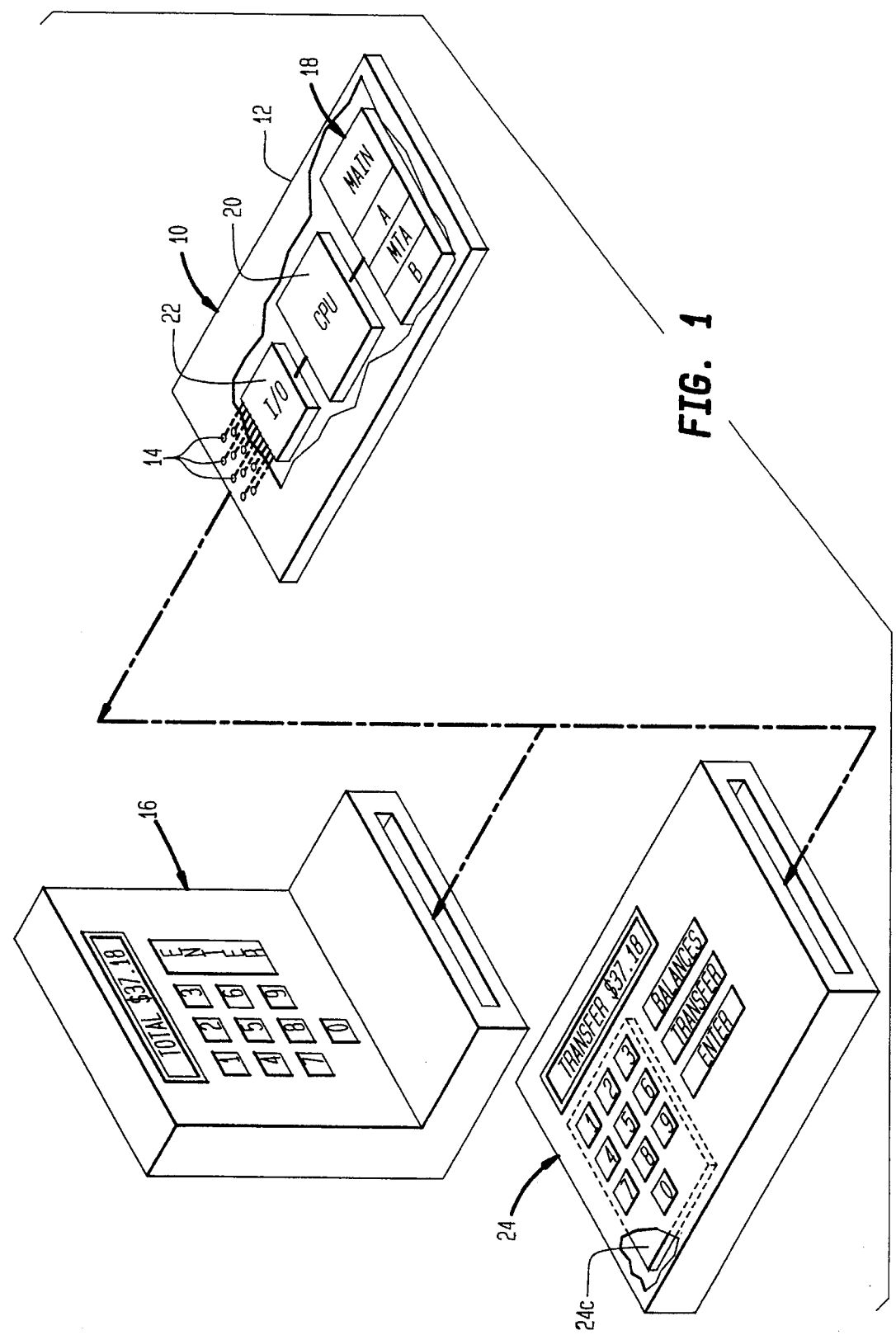
FIG. 1 is a schematic representation of an electronic purse card in accordance with one embodiment of the present invention usable in combination with a secure transaction device and a foreign transaction device.

Illustrated in FIG. 1 is an exemplary electronic purse card or SmartCard 10 which is in the form and size of a typical plastic credit card. The card 10 includes a suitable housing 12 such as plastic having a plurality of electrical contacts 14 disposed thereon for communicating with a separate, foreign transaction device 16. The card 10 further includes a conventional computer chip having a memory section 18 disposed or imbedded in the housing 12, and a central processing unit (CPU) or processor 20 similarly disposed or imbedded in the housing 12. The processor 20 is conventionally operatively joined to the memory 18, and to the contacts 14 through a conventional input/output device 22. The basic electronic card 10 may take any suitable form and configuration having both memory and processing capability. For example, the card 10 may be built under the International Standards Organization (ISO) Series specifications 7810, 7811, and 7816, for example.

In accordance with one embodiment of the present invention, the card memory 18 preferably includes a first file or register designated A for selectively storing a main amount of suitable currency therein. For example, the card 10 may be initially set with $100 of available currency in the first register A by suitably downloading thereto that amount from a bank account, a credit card, a debit card, another electronic card 10, or any other suitable source. The memory 18 further preferably includes a second file or register designated B for selectively storing a withdrawable amount of currency from the card 10 which will typically be less than the amount stored in the first register A. The processor 20 is configured with suitable software for selectively allowing downloading of a selected portion of currency from the first register A into the second register B, and for allowing withdrawal of currency amounts by the foreign transaction device 16 solely from the second register B.

In operation, the card owner or user uses an exemplary trusted or secure transaction device 24 for downloading from the first register A to the second register B of the card memory 18 a selected portion of the amount of currency prestored in the first register A. The card 10 is then removed from its mating slot in the secure device 24 and inserted into a corresponding slot in the foreign device 16 for completing the transaction by withdrawing or transferring solely from the second register B into the foreign transaction device 16 a transaction amount up to but not exceeding the amount in the second register B.

The secure device 24 is preferably portable and not much larger than the card 10 and is configured for communicating with the card 10 through the contacts 14 when the card 10 is inserted into the corresponding slot therein. The secure device 24 may take any suitable form and itself may include a suitable computer chip 24c having a processor and memory for controlling the required functions thereof. As shown in FIG. 1, the secure device 24 has suitable keys for entering the numbers 0–9, suitable keys for common functions such as "balances," "transfer," "enter," and an interface viewing screen. The secure device 24 may be a special-purpose device configured specifically for use with the card 10, or it may be incorporated into other equipment such as a Personal Communication Service (PCS) mobile communication handset for example.

The card 10 may firstly be inserted into the secure device 24 for allowing the user to enter the desired transfer mount from the first to second registers A, B, which in the example illustrated in FIG. 1 is $37.18. The card 10 is then removed from the secure device 24 and inserted into the foreign device 16 wherein the transaction amount, e.g. $37.18, is shown in a corresponding viewing screen thereof. The foreign device 16 may then debit or withdraw solely from the second register B of the card 10 an amount up to the maximum amount contained therein which in this example is also $37.18. The foreign device 16 is not given access to the first register A in this mode of operation, which therefore prevents unauthorized withdrawals therefrom.

The foreign transaction device 16 illustrated in FIG. 1 may take any suitable conventional form having a slot for receiving and communicating with the electronic card 10, a suitable screen for viewing transaction amounts, and suitable numeric keys 0–9, and enter and other keys as required. The foreign device 16 will also have its own conventional computer chip with a suitable identification number stored therein. The foreign device 16 will typically be available at stores, gas stations and the like where credit card and checks are typically taken in lieu of cash for making purchases.

Figure 2:
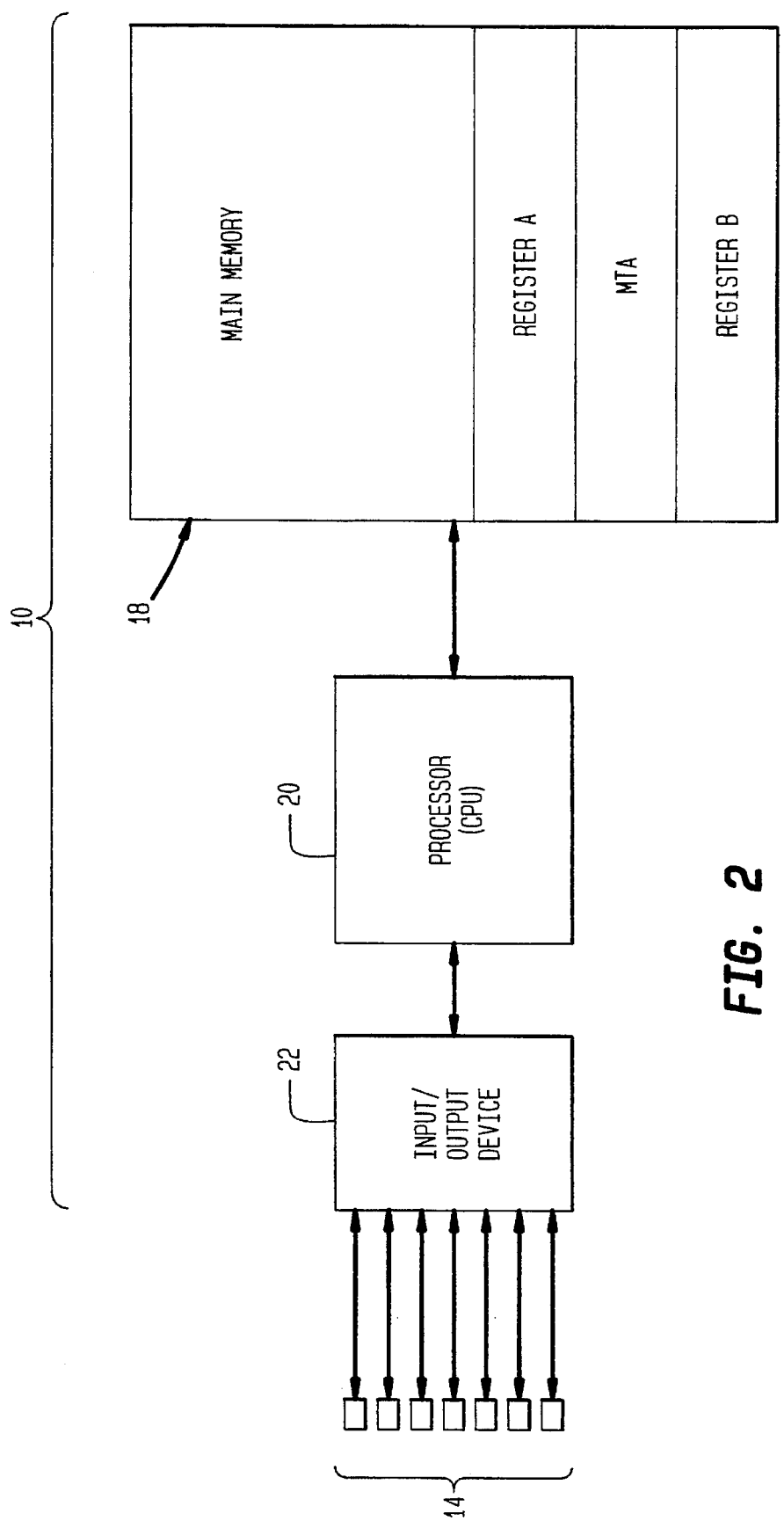
FIG. 2 is a block diagram representation of the electronic purse card illustrated in FIG. 1 showing selected components therein including a computer processor and memory.

FIG. 2 illustrates schematically the electronic card illustrated in FIG. 1 including the processor 20 operatively joined to the input/output device 22 and in turn joined to the plurality of contacts 14. The card memory 18 is operatively joined to the processor 20 and includes in part the first and second registers A and B.

FIG. 3 illustrates in a flow chart a method of operating the card 10 by firstly inserting the card 10 into a transaction device (TD) such as the foreign device 16 or the secure device 24. Suitable software within the processor 20 allows the card 10 to request and check a suitable identification number (ID) such as a serial number stored in the transaction device to determine whether the transaction device is a secure device such as device 24 or a foreign device such as device 16, with the ID numbers being different of course. By definition, a secure transaction device 24 may either be a specific transaction device owned by the user of the card 10 or any other device 24 which the user designates as being secure. The corresponding identification numbers of these secure devices are suitably stored in the card memory 18 solely by the user or owner thereof and are not accessible by any foreign device 16. The foreign device 16 by definition is any device which may be potentially untrustworthy, such as those devices found in stores, and which perform the withdrawing operation from the card 10. An unscrupulous vendor may modify the foreign device 16 to surreptitiously attempt to remove as much available currency as possible from user cards 10. By limiting access of the foreign device 16 solely to the second register B, fraudulent withdrawals from the card 10 may be reduced or eliminated.

As shown in FIG. 3, the transaction device identity check will identify either the secure transaction device 24, or the foreign transaction device 16, and if no identification number is available, the card 10 will simply be returned without permitting any further action, or the user may be given the option to proceed on the assumption that the device is foreign.

Exemplary methods of operation using the secure transaction device 24 in combination with the electronic card 10 are illustrated in the FIG. 4 flow chart. The secure device 24 may be used as disclosed above for setting or resetting the amount contained in the second register B of the card 10. Accordingly, the card processor 20 includes suitable means in the form of software for allowing unrestricted or unlimited downloading of currency portions from the first to second registers A and B, preferably solely with a predetermined identification number such as the serial number of a secure device 24 or a personal identification number (PIN). In the situation using a separate secure transaction device 24, the PIN may not be necessary since the secure device 24 should be sufficiently trustworthy itself. However, the use of a PIN is preferred in the event of misappropriation of the card 10 and its corresponding secure device 24 by an unauthorized user. As shown in FIG. 4, the processor 20 requires entry of a recognized PIN, which may be re-entered a predetermined number of times, for example three times, in the event that it is initially incorrectly entered. A suitable PIN can have any number of digits as desired, typically four digits for ease of use and remembering, and is suitably stored in the card memory 18. Exceeding the permitted number of re-entries, will cause the card 10 to be rejected without any further operations being permitted. Correct entry of the PIN will allow operation of all permitted functions available through the secure device 24.

For example, the user may wish to download into the second register B a specific transaction amount (TA) required for a specific purchase. The transaction amount is entered through the secure device 24, with the processor 20 determining whether this amount is less than or equal to the total amounts contained in the first and second registers A and B. If the transaction amount is greater than the available funds in the card 10, the downloading is rejected. If the transaction amount is within the available funds, the required amount of funds are downloaded from the first register A to the second register B. As shown in FIG. 4, the second register B may be set to the actual transaction amount TA, or to a suitably larger value if desired. The second register B is then ready for completing the transaction described in more detail below.

Another function available by using the secure device 24 as illustrated in FIG. 4 includes resetting the personal identification number which may be accomplished firstly by entering the original PIN before proceeding. The new PIN is typically entered twice to ensure its accuracy and then is suitably stored in the main portion of the card memory 18 replacing the previously stored old PIN therein.

Also, as indicated in FIG. 4, the secure device 24 can be used to delete from or add to the card memory the identification number (ID) of devices to be considered "trusted" or secure, up to some maximum number as desired.

Figure 5:
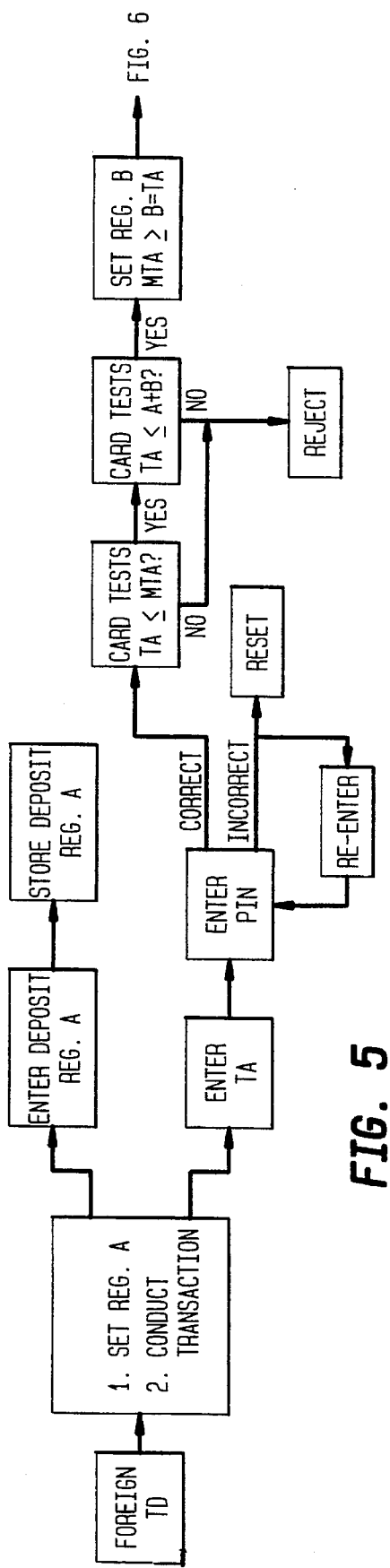
FIG. 5 is a flow chart of the electronic card processor software indicating exemplary operations available from a foreign transaction device.

As illustrated in FIG. 5, a foreign transaction device, such as device 16, may be used for two basic functions. One function is to set the first register A by downloading thereto a desired amount of currency. And secondly, to conduct a purchasing transaction from a vendor for example. Since downloading currency into the card 10 provides the user thereof with value, little if any security measures are required in permitting downloading into the first register A. Accordingly, the foreign transaction device 16 may take any suitable form such as that illustrated in FIG. 1 for receiving the card 10 and providing access to a source of funds such as a bank account, a credit card, a debit card, or another electronic card 10 for example. In a typical situation, the Automated Teller Machine (ATM) available at many banks and remote sites could be adapted for use in a conventional fashion for accessing an authorized source of funds, with a portion of the funds being withdrawn not as cash but downloaded into the first register A of the card 10 inserted into a suitable communicating slot therein. Although depositing funds into the card 10 is done using the foreign device 16, in alternate embodiments it may be accomplished using a suitable secure device like that represented by FIG. 4 if desired.

In the event the user does not have available his secure transaction device 24 in order to download funds into the second register B, the foreign transaction device 16 may also be used with certain precautions and risks, for allowing downloading of funds to the second register B and the withdrawal therefrom. More specifically, and referring again to FIG. 5, the desired transaction amount (TA) required for a specific transaction, for example making a purchase from a vendor, is either manually entered by the user in the keyboard illustrated in FIG. 1 for example, or may be automatically entered by the foreign device 16 based on the total of the items being purchased. Once the user agrees with the entered total amount, he may enter his PIN into the foreign device 16, and re-enter it if required for a suitable number of times in the event it is initially entered incorrectly. Three enter attempts, for example, may be permitted by the card processor 20 before rejecting the transaction for limiting the foreign device 16 itself from surreptitiously randomly entering PINs. The risk in this process is that the foreign device 16 could download to register B, and then subtract from register B an amount greater than the amount shown on the display screen, and therefore greater than intended by the card user. However, the user may be willing to take such a risk, in certain circumstances.

Referring again to FIG. 5, once the transaction amount and correct PIN are entered into the foreign device 16, suitable means in the form of software in the processor 20 of the card 10 tests the transaction amount to determine whether or not it is less than or equal to a predetermined maximum transfer amount (MTA) prestored by the user in the card memory 18 (See FIGS. 1 and 2). The MTA value provides a suitable limit selected by the user for limiting currency downloading between the first and second registers A, B to reduce the amount of fraudulent withdrawals from the card 10 when the secure device 24 is unavailable. The MTA may be set for example at $40.00 for preventing the foreign device 16 from accessing at any one time more than $40.00 from the first register A of the card 10. The card 10 rejects the transaction if the transaction amount is greater than the MTA. If the transaction amount is less than or equal to MTA, the card processor 20 tests or checks the transaction amount to determine whether or not it is within the total amount of currency available in both registers A and B. If insufficient funds are available in the card 10 for the transaction amount, i.e. TA> A+ B, the transaction is rejected. If sufficient funds are available in the card 10, i.e. TA$\leq$ A+B, the processor 20 downloads the required amount of currency from the first register A into the second register B for equalling the desired transfer amount, i.e. B=TA, which is necessarily less than or equal to the MTA. Of course, the amount in the first register A is correspondingly reduced.

Figure 6:
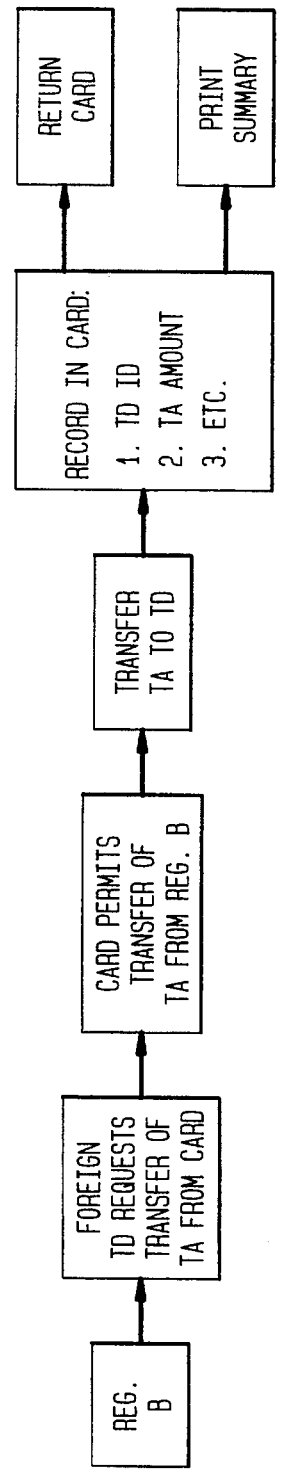
FIG. 6 is a flow chart of the processor and transaction device software indicating exemplary operations for withdrawing currency from the card and recording the withdrawal.

Accordingly, the amount in the second register B may be set by the user either using his secure device 24 as illustrated in FIG. 4, or by using the foreign transaction device 16 as illustrated in FIG. 5. In both situations, the second register B contains sufficient currency amounts for the specific transaction, with payment or transfer of the required amount to the foreign transaction device 16 being effected as illustrated in FIG. 6. More specifically, the foreign device 16 requests transfer of the transaction amount (TA) from the second register B of the card 10, with the processor 20 of the card 10 permitting transfer thereof from the second register B. The transaction amount is transferred or withdrawn from the second register B to the foreign transaction device, 16, with the amount in register B being correspondingly reduced. The processor 20 preferably also includes software for recording in the memory 18 of the card 10 a suitable record of the transaction including the transaction amount, identification number of the foreign transaction device 16, and any other suitable information such as date and time if desired. The card 10 is then returned to the user 10, and a printout of the summary of the transaction may also be made by the foreign transaction device 16.

Although the MTA is used to limit downloading of currency amounts from the first to second registers A, B, it may alternatively be used to limit direct transfer from the first register A to the foreign device 16, bypassing the second register B if desired. In both methods, the safeguarding effect is similar in that the MTA is the maximum amount that can be transferred from the card 10 in any single transaction. But in the method which does use register B, the maximum amount of a particular transaction can be set to an amount lower than MTA.

As illustrated in FIG. 1, the predetermined maximum transfer amount (MTA) is suitably stored in the memory 18 of the card 10, and is preferably selected or changed solely by the secure transaction device 24 as indicated schematically in FIG. 4. Upon entering the correct PIN into the secure device 24, the user may then enter or change the MTA stored in the memory 18. In order to reduce fraudulent use of the card 10, the MTA is changeable solely from the secure device 24, with the software in the processor 20 preventing changing of the MTA through the foreign device 16 as identified by its identification number.

However, it is possible, in cases where the foreign device 16 and a PIN are used to download an amount from register A to register B, that the foreign device 16 may be improperly modified to surreptitiously accomplish multiple, successive downloading from the first to second registers A,B using the set MTA, changeable only by the user. In order to discourage unauthorized multiple withdrawals for a single transaction, the software in the card processor 20 may suitably provide an adequate record of the transaction in the card memory 18 as described above with respect to FIG. 6. In this way, the user may examine transaction records stored in the card 10 and compare those records with any paper receipts or summaries obtained for the various transactions. This may help to identify any fraudulently used foreign device 16.

In a preferred embodiment, the card processor 20 preferably also includes suitable software requiring predetermined time delay between successive withdrawals from the card 10 by a foreign device 16 using the MTA method. A suitable clock is contained in the processor 20 for timing successive withdrawals, and would permit successive withdrawals only after a predetermined time interval of about one or two minutes for example. In this way, any unreasonable delay in processing a single transaction could suggest fraudulent successive withdrawals from the card 10, with the card user taking suitable action such as removing the card 10 from the foreign device 16.

As illustrated in FIG. 1, the card 10 and the secure transaction device 24 may be separate components, and are removably joinable together at the electrical contacts 14 for allowing communication therebetween. The secure device 24 is relatively compact in size and is portable with the card 10 for convenience. Alternatively, the secure device 24 may be safeguarded at a convenient location such as in the home of the user, with a suitable amount of currency downloaded into the second register B for expected single or multiple transactions.

Figure 7:
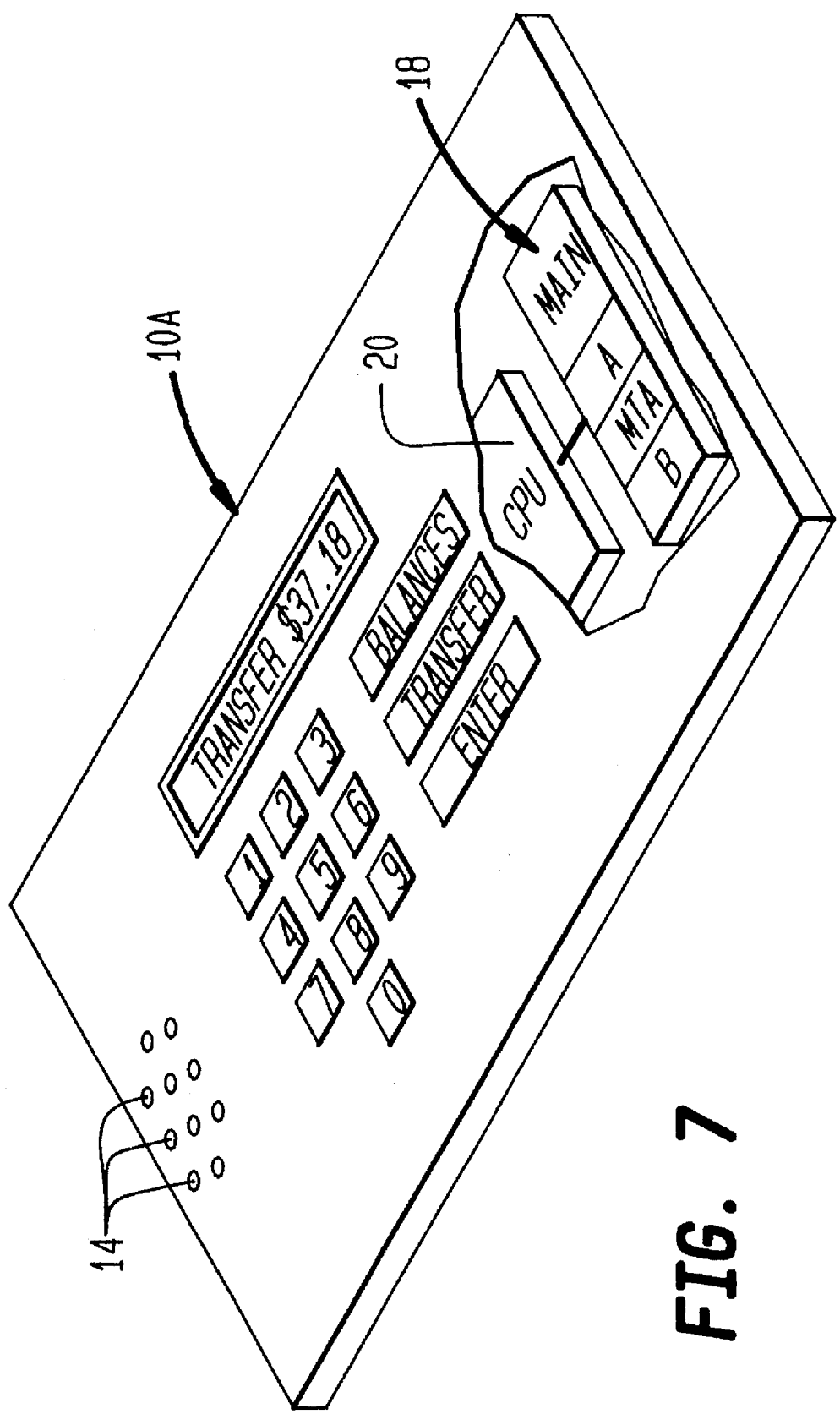
FIG. 7 is a perspective, partly schematic representation of the electronic purse card illustrated in FIG. 1 in an alternate embodiment having an integral secure transaction device therewith.

FIG. 7 illustrates an alternate embodiment of the electronic card 10 designated 10A, wherein the card itself and the secure transaction device are a one-piece or integral assembly. In this embodiment, the face of the card 10 includes a suitable viewing screen and suitable numeric keys 0–9, as well as suitable function keys similar to those illustrated in FIG. 1, with the required processor for the secure transaction device being common with the processor 20 of the card 10 for performing all required functions thereof. This embodiment improves convenience of use, while maintaining security since a suitable PIN is required for accessing the functions and memory of the card 10A. Inasmuch as the secure device is integral with the electronic card 10, it need not have a separate identification number which may be checked in the flow chart of FIG. 3. However, the foreign device 16 may still be checked, with its ID being recorded in the card 10 as described above. As illustrated in the flow charts of FIGS. 4 and 5, a suitable PIN may be used for controlling separate functions available through the foreign device 16 or through the "secure" device now integral with the card 10A. In this case, the PIN associated with the FIG. 4 operation of the integral card 10A is preferably different from and longer than the PIN used in the FIG. 5 functions. This will reduce the likelihood of fraudulent access to the functions illustrated in FIG. 4 when the integral card 10A is used in the foreign device 16 for the functions illustrated in FIG. 5. The different PINs are suitably stored in the card memory 18, with both PINs being accessible and changeable solely upon entering the "secure" PIN represented in the FIG. 4 functions. In this way, the PIN entered in the FIG. 5 functions will not compromise the functions illustrated in FIG. 4.

Accordingly, the electronic cards 10, 10A disclosed above provide an electronic purse with the two registers A and B for improving security of use of the cards during operation. The user may either download currency without limit from the first register A to the second register B when using the secure transaction device 24. Or, if the foreign transaction device 16 is used, currency may be downloaded from the first to the second registers A, B subject to the maximum transfer amount (MTA). In both situations, the currency amount stored in the first register A is secure against unlimited withdrawals therefrom from the foreign device 24. The one or more PINs described above provide an additional level of security for the cards by limiting access thereto only to those having knowledge of the PINs.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An electronic purse card provided with a main amount of currency usable with a separate foreign transaction device and comprising:

a housing;

a plurality of electrical contacts disposed on said housing for communicating with said foreign transaction device;

a memory disposed inside said housing and including a first register for selectively storing said main amount of currency, and a second register for selectively storing a withdrawable amount of currency downloaded from said first register by using said electronic purse card in combination with a particular secure transaction device, said withdrawable amount of currency being downloaded from said first register to said second register only when a predetermined identification number associated solely with said secure transaction device is identified by said electronic purse card; and a processor disposed inside said housing and operatively joined to said contacts and said memory, and being configured for allowing downloading of a selected portion of said main amount of currency from said first register into said second register, and for allowing withdrawal of a transaction amount by said foreign transaction device solely from said second register.

2. A card according to claim 1 wherein said processor downloading means is effective for limiting said currency downloading to a predetermined maximum transfer amount (MTA).

3. A card according to claim 1 wherein said predetermined identification number of said secure transaction device is different from an identification number of said foreign transaction device, and wherein said processor includes means for allowing unlimited downloading of currency portions from said first register to said second register.

4. A combination according to claim 3 wherein said processor further includes means for limiting currency downloading from said first register to said second register by said foreign transaction device to a predetermined maximum transfer amount (MTA), with said MTA being selectable solely by said secure transaction device.

5. A combination according to claim 4 wherein said card and said secure transaction device are separate components, and are removably joinable together at said electrical contacts for allowing communication therebetween.

6. A combination according to claim 4 wherein said card and said secure transaction device are an integral assembly.

7. A method of operating an electronic purse card provided with a prestored given amount of currency with a separate, foreign transaction device, said card having a plurality of electrical contacts for communicating with said foreign transaction device, a memory, and a processor operatively joined to said contacts and said memory, said method comprising:

downloading from a first register to a second register of said card memory a selected portion of said given amount of currency prestored in said first register by using a particular secure transaction device and identifying a predetermined identification number associated solely with said secure transaction device to identify said secure transaction device as being the proper secure transaction device to be used with said electronic purse card; and withdrawing solely from said second register into said foreign transaction device a transaction amount up to said given amount of currency downloaded in said second register.

8. A method according to claim 7 wherein said integral secure transaction device is with said card in said downloading step.

9. A method according to claim 7 wherein said downloading step is effected using said foreign transaction device, and further comprising limiting said downloading of currency amount from said first register to said second register by a predetermined maximum transfer amount.

10. A method according to claim 9 wherein successive ones of said withdrawing step are limited by a predetermined time delay therebetween.

11. A method according to claim 9 further comprising storing in said card memory a record of said downloading and withdrawing steps effected using said foreign transaction device.

* * * * *